United States Patent [19]

Harrison et al.

[11] Patent Number: 5,619,398
[45] Date of Patent: Apr. 8, 1997

[54] MANUAL DOCKING APPARATUS HAVING LATCH AND DRIVE MECHANISM FOR A PORTABLE COMPUTER

[75] Inventors: Robert C. Harrison, Houston; Steven J. Lau, Tomball, both of Tex.

[73] Assignee: COMPAQ Computer Corporation, Houston, Tex.

[21] Appl. No.: 579,290

[22] Filed: Dec. 27, 1995

[51] Int. Cl.⁶ .............................. G06F 1/16; H05K 7/10; H01R 13/629
[52] U.S. Cl. ............................................. 361/686; 439/159
[58] Field of Search ........................ 364/708.1; 439/152, 439/153, 155, 157, 158, 159, 160, 310, 342, 347, 377, 377.2; 361/683, 686

[56] References Cited

U.S. PATENT DOCUMENTS

| | | | |
|---|---|---|---|
| 5,313,596 | 5/1994 | Swindler et al. | 361/686 X |
| 5,323,291 | 6/1994 | Boyle et al. | 361/686 |
| 5,384,686 | 1/1995 | Mesfin et al. | 361/686 |
| 5,402,310 | 3/1995 | Penniman | 361/686 |
| 5,461,546 | 10/1995 | Kobayashi et al. | 364/708.1 X |
| 5,477,415 | 12/1995 | Mitcham et al. | 361/686 |
| 5,535,093 | 7/1996 | Noguchi et al. | 361/686 |

*Primary Examiner*—Michael W. Phillips
*Attorney, Agent, or Firm*—Konneker & Smith

[57] ABSTRACT

An expansion base structure is provided with a manual docking system useable to releasably connect a portable computer to desktop computer peripherals such as a keyboard, printer and monitor, via a first electrical connector carried by a rear portion of the base structure. The docking system includes a moveable latch and drive structure that is driveably linked to a manually pivotable control lever. Docking is initiated by placing the computer on a support deck portion of the expansion base and then pushing the computer rearwardly into latched engagement with the latch and drive structure, with latch arm portions thereof received and locked within holes in the rear side wall of the computer. The computer may be operatively docked by then pushing the computer further rearwardly until an electrical connector on its rear side mates with an electrical connector on the expansion base, or by pivoting the lever to cause the latch arms to rearwardly pull the computer to effect this connector mating. To undock the computer the lever is rotated in the opposite direction to decouple the latch arms from the computer and to force a drive plate portion of the docking structure forwardly against the rear side of the computer to forcibly disengage the two electrical connectors.

20 Claims, 3 Drawing Sheets

MANUAL DOCKING APPARATUS HAVING LATCH AND DRIVE MECHANISM FOR A PORTABLE COMPUTER

BACKGROUND OF THE INVENTION

1. Field of the Invention

The present invention relates generally to computer apparatus and, in a preferred embodiment thereof, more particularly relates to a manual docking structure used to releasably and operatively connect a portable computer to desktop peripheral equipment such as a monitor, keyboard and mouse.

2. Description of Related Art

Portable, battery-powered notebook computers have become increasingly popular over the last several years due to their light weight and small size that permit them to be easily hand-carried in an ordinary briefcase and used by business travelers in cramped spaces, such as on airline seat back trays, lacking electrical plug-in facilities. The modern notebook computer typically has incorporated therein both hard and floppy disc drives, a monitor screen built into its lid portion, and a keyboard built into its main body portion. It is thus a fully self-contained computer able to be conveniently used, for at least short periods of time, in situations and locations in which the use of a much larger desktop computer is simply not feasible.

As is well known, however, even state-of-the-art notebook computers have certain limitations and disadvantages, arising from their otherwise desirable diminutive sizes, compared to their much larger desktop computer counterparts. For example, the compact keyboard of a notebook computer is often considerably less comfortable to use for extended periods of time compared to the more spacious separate keyboards normally provided with desktop computers.

Additionally, to reduce the space requirements for the typical notebook computer keyboard, many of its keys, that would have but a single function on a desktop computer keyboard, are provided with multiple functions which can be confusing to a user switching back and forth between desktop and notebook computers. Moreover, compared to its desktop computer counterpart, the notebook computer monitor typically does not provide its viewer with as sharp a display image. After an extended computing session, this reduction in display clarity can cause the computer user to experience at least some degree of eye strain. Another disadvantage of portable computers is that, due to their small size, they typically do not provide access for expansion cards such as, for example, network, sound, graphics accelerator and multi-media cards which desktop computer units are conventionally configured to receive.

Because of these shortcomings inherent in notebook computers, it is a common practice for their owners to also purchase a desktop computer system for home or office use. A typical scenario for these two-computer owners, after returning home after using their notebook computer on a business trip, is to transfer their files, data, spreadsheets and the like from their notebook computer to their desktop computer and continue working on the initiated project or projects using the larger and more comfortable desktop peripheral equipment such as the external monitor, keyboard and mouse.

The task of effecting this data transfer from a notebook computer to the desktop computer (and vice versa in preparation for a subsequent road trip) is not a particularly convenient one for the computer user. It is typically accomplished by the often time consuming method of (1) inserting a floppy disc into the notebook computer, (2) copying a portion of the data from the notebook computer hard drive onto the inserted floppy disc, (3) removing the floppy disc from the notebook computer, (4) inserting the removed floppy disc into the hard drive of the desktop computer, and then (6) repeating steps (1) through (5), as necessary, until all of the desired data is transferred from the notebook computer to the desktop computer.

Alternatively, various software is available for use in a notebook computer to download data therefrom to a desktop computer through a cable interconnected between the serial ports on the notebook and desktop computers. This procedure, while somewhat more convenient than laboriously shuffling floppy discs back and forth between the two computers, has other disadvantages. For example, it requires the additional purchase and installation of the transfer software which occupies space in the notebook hard drive—space which is often at a premium in the relatively small hard drives typically provided in notebook computers.

Moreover, each time data is to be transferred from the notebook computer to the desktop computer, a cable must be interconnected between the two computers and subsequently disconnected. This can be a rather awkward task since the serial port on a desktop computer is typically located on its back side in the midst of a jumble of other cables.

In addition to the inconvenience of these conventional methods of transferring data back and forth between notebook and desktop computers there is, of course, the considerable expense entailed in purchasing two complete computer systems to provide both the compactness and portability of a notebook computer and the greater capacity and use comfort of a desktop computer. Some of this expense may be avoided by purchasing (in addition to the notebook computer) only desktop computer peripheral equipment—such as a monitor, keyboard, mouse and external hard drive—for home or office use.

When the user works at his home or office station he connects the notebook computer to the desktop computer peripheral equipment, using the necessary interconnect cables, to fashion a hybrid computer system utilizing the notebook computer CPU in conjunction with the desktop computer peripheral devices. While this alternative approach is less expensive than purchasing two complete computer systems, it is highly inconvenient due to the number of cables that must be connected between the notebook computer and the desktop peripherals, to "construct" the hybrid system, and later be disconnected to free the notebook computer for travel use. Additionally, the jumble of interconnect cables sprawling across the desk or table area creates a decidedly disorderly and unattractive work station.

In response to these problems and inconveniences, interconnect structures commonly referred to as "docking stations" have been previously proposed. A docking station is basically an enclosed housing or open support structure, considerably larger than a notebook computer and designed to be left in place on a home or office desktop, to which the notebook computer may be removably connected by releasably interengaging mating plug and socket portions fixedly secured to the notebook computer and the associated docking station.

The docking station is typically connected to external desktop peripheral devices, such as a monitor, keyboard and mouse, that remain in place on the desktop work station.

Disposed within the docking station housing are various components that serve to operatively connect the notebook computer to these desktop peripheral devices when the notebook computer is plugged into the docking station. However, the docking station is typically not provided with a central processing unit. Instead, when the notebook computer is "docked" in this manner, its central processing unit is utilized in the resulting desktop computer work station and the desktop keyboard, monitor and mouse are used in any subsequent desktop computing tasks. After these tasks are completed, the notebook computer can simply be unplugged from the docking station and carried away for use of the removed notebook computer in its usual self-contained mode.

compared to the previous necessity of purchasing a complete desktop computer system in addition to a notebook computer, the use of this docking station concept provides several distinct advantages. For example, since the docking station is not furnished with its own central processing unit (using, in place thereof, the notebook computer CPU) the overall cost of providing both portable and home or office-based computer work stations is substantially reduced.

Additionally, the previous inconvenience of transferring data from the notebook computer to the desktop system is essentially eliminated since the requisite notebook/desktop computer interface for this data transfer is achieved simply by plugging the notebook computer into the docking station (which may have an internal hard drive or be connected to an external hard drive) without the need for switching floppy discs back and forth or using an external interconnection cable. Moreover, from a connection convenience standpoint, the use of the plug-in docking station is clearly preferable to laboriously connecting the notebook computer directly to desktop peripheral devices using several separate interconnect cables.

Despite their cost reduction and convenience advantages, previously proposed docking stations have tended to have certain problems associated therewith relating to their physical connection to the associated notebook computer. For example, since the relatively small plug-in interface between the docking station and the notebook computer must effect a multitude of electrical connections between the internal operating components in the notebook computer and the docking station, mating high density pin connector structures (one on the notebook computer and one on the docking station) are typically used to provide the plug-in computer/docking station mechanical interconnection.

A typical method of creating this interconnection is to place the notebook computer on the docking station, with the mating pin connectors in a facing, spaced apart relationship with one another, and then manually push the notebook computer toward the docking station connector pin structure to create the plug-in connection. The need to precisely align the facing connectors, coupled with the high mating force requirement associated with these high density pin connectors, typically requires that this manual connection task be carefully and precisely performed to avoid potential damage to the connector pin structures. The same care must be exercised, and a considerable amount of manual force exerted, in disconnecting the notebook computer from the docking station to avoid connector pin damage.

Various manual docking mechanisms have been previously proposed to exert a mechanically advantaged connection force on the notebook computer and to hold the docked computer in place on the docking structure. These manual systems are typically operated by placing the notebook computer on a platform portion of the docking station in a spaced relationship with the docking station connector structure and then moving a portion of the mechanically advantaged force-exerting structure against the computer to push the computer toward the docking station connector structure and drive its connector pin structure into mating engagement with the docking station connector pin structure.

While this mechanically advantaged docking structure reduces the manual mating force that needs to be exerted by the computer user, connector pin structure alignment problems can still arise if care is not exercised. Additionally, a high manual force by the user is still typically required to subsequently unplug the notebook computer from the docking station. When the notebook computer is inserted into the interior of a housing structure to dock the computer, it can be awkward to properly grasp the docked computer and thereafter exert this manual undocking force.

It can be seen from the foregoing that it would be desirable to provide a portable computer docking system having improved manual computer docking and undocking apparatus that eliminates or at least substantially reduces the above-mentioned problems, limitations and disadvantages typically associated with conventional manual docking apparatus of the type generally described above. It is accordingly an object of the present invention to provide such a system.

SUMMARY OF THE INVENTION

In carrying out principles of the present invention, in accordance with a preferred embodiment thereof, manual docking apparatus is provided for use in operatively connecting a portable computer to a desktop computer peripheral device, the portable computer having a rear side wall upon which a first electrical connector is carried.

The manual docking apparatus comprises an expansion base structure having a generally horizontally oriented support deck upon which the portable computer may be positioned for forward and rearward sliding movement relative thereto, a rear portion having a second, forwardly disposed electrical connector releasably mateable with the first electrical connector to couple it to the peripheral device, and guide members slidably engageable with the portable computer and operative to horizontally align the second electrical connector with the first electrical connector.

The manual docking apparatus further comprises a manual docking assembly operable, with the portable computer placed on the support deck, to horizontally move the portable computer toward and away from the rear expansion base structure portion in a manner respectively mating and disconnecting the first and second electrical connectors. Included in the manual docking assembly are latch and drive means, and control means.

The latch and drive means are associated with the rear expansion base structure portion and are operatively movable sequentially from (1) a pre-docking position in which, in response to rearward manual movement of the portable computer toward the latch and drive means along the support deck, the latch and drive means are releasably locked to the rear side wall of the portable computer, with the first and second electrical connectors being aligned with one another but not operatively coupled, to (2) a docked position in which the latch and drive means have been moved to drive the rear side wall of the portable computer toward the rear expansion base structure portion in a manner forcibly mating the first and second electrical connectors, to (3) an undocked, released position in which the first and second electrical connectors have been forcibly disengaged from one another and the latch and drive means have been detached from the rear side wall of the portable computer.

The control means are operative to receive a manual positioning force and responsively move the latch and drive means, preferably via a mechanically advantaged force exerted thereon, selectively between their pre-docking position, their docked position, and their undocked, released position. Preferably, the latch and drive means are also operative to be moved from their pre-docking position to their docked position in response to a direct rearward manual force exerted on the portable computer when the latch and drive means are in their pre-docking position. Accordingly, either a direct manual force or a mechanically advantaged force exerted by the control means may be used to dock the portable computer.

In a preferred structural form thereof, the manual docking apparatus comprises a horizontally positionable support deck having a rear side portion, and a pair of upwardly projecting elongated guide portions longitudinally extending in a spaced apart, parallel relationship along opposite left and right side portions of the support deck, a support block member carried on the rear side portion of the support deck and having a front side, and an electrical connector carried on the front side of the support block member.

A first elongated member is carried by the support deck for longitudinal movement in a front-to-rear direction relative thereto, and a manual pivot member is carried by the support deck for pivotal movement relative thereto and linked to a front end portion of the first elongated member in a manner longitudinally moving it in a front-to-rear direction in response to manually created pivotal movement of the pivot member.

A second elongated member is pivotally connected at a first end thereof to a front end portion of the first elongated member, is pivotally connected at a longitudinally intermediate portion thereof to the support block member, and has a second end. A drive plate member is supported above the support block for sliding forward and rearward movement relative thereto, the drive plate member being pivotally secured to the second end of the second elongated member in a manner causing the drive plate member to be driven forwardly in response to rearward movement of the first elongated member, to forwardly engage the computer and drive it out of docked engagement with the docking apparatus, and to be driven rearwardly in response to forward movement of the first elongated member.

The manual docking apparatus also includes a spaced pair of elongated latch arm members having indented front end portions and being supported above the support block, on opposite sides of the drive plate member, for longitudinal movement in front-to-rear directions between a rearwardly shifted first position in which the latch arm members are generally parallel, with the indented front end portions thereof forwardly projecting outwardly beyond the support block and latchingly received in associated rear side wall openings in the portable computer, and a forwardly shifted second position in which the front end portions of the latch arm members are pivoted outwardly from one another toward the guide portions of the support deck to permit removal of the front latch arm ends from the rear commuter side.

The latch arm members and the drive plate member have cooperatively engaged portions operative to cause the drive plate member to drive the latch arm members from their first position to their second position in response to forward movement of the drive plate member relative to the support block.

DETAILED DESCRIPTION

Figure 1:
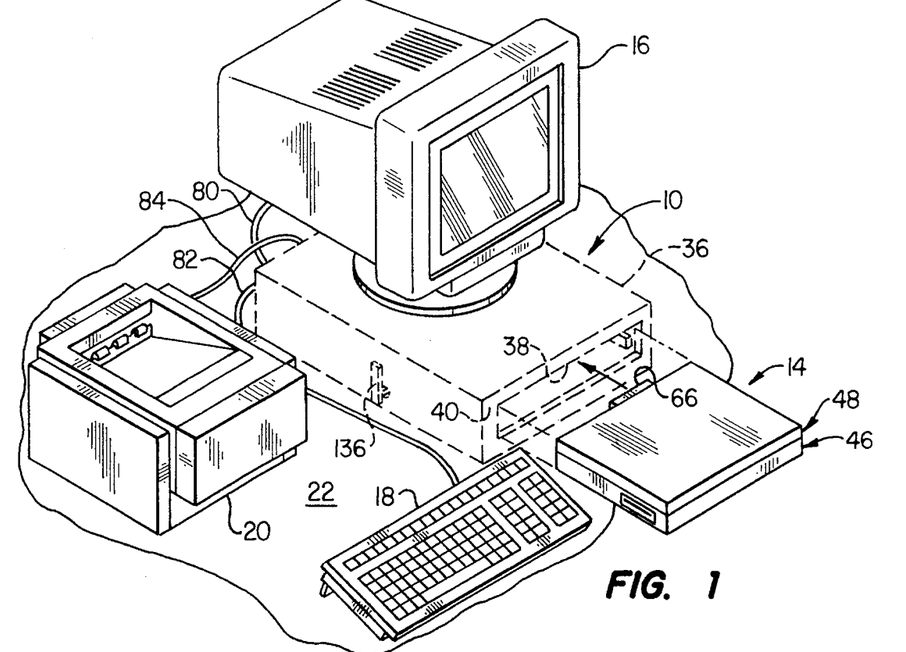
FIG. 1 is a perspective view of an expansion base structure (shown in phantom) incorporating therein a manual docking system embodying principles of the present invention and used to operatively link the illustrated portable computer with the illustrated desktop peripheral devices.
Figure 2:
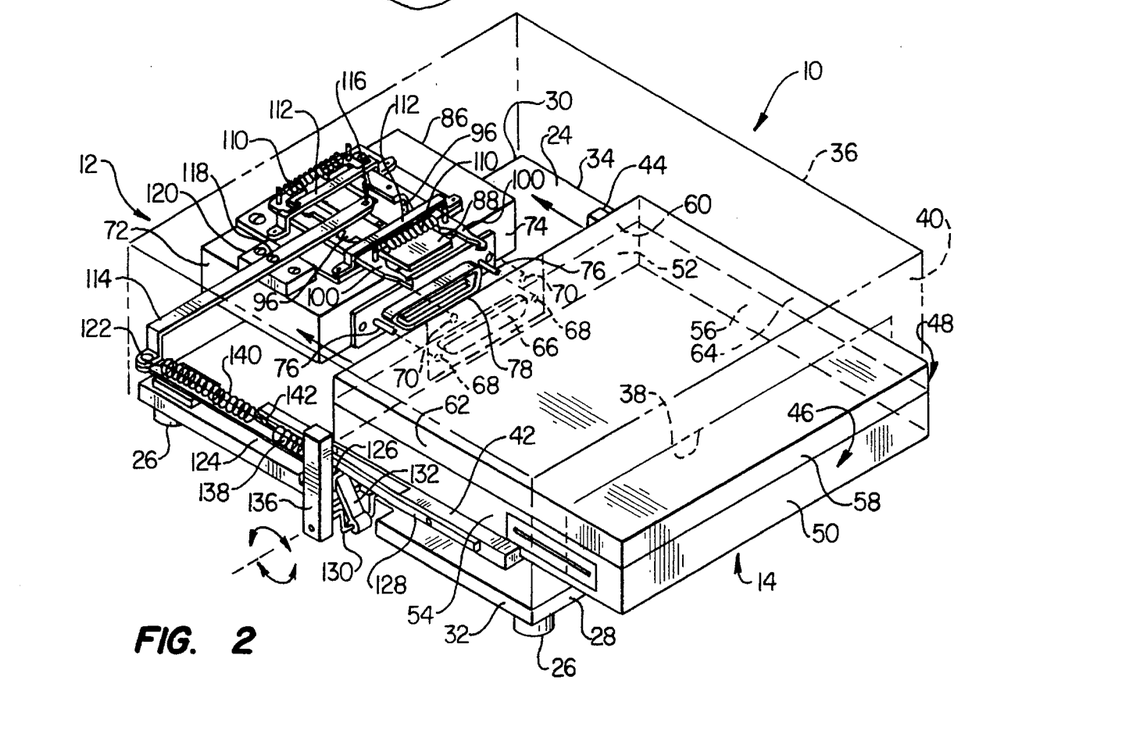
FIG. 2 is an enlarged scale partially phantomed perspective view of the expansion base structure illustrating the portable computer and the expansion base structure in a pre-docking orientation.

Referring initially to FIGS. 1 and 2, the present invention provides an expansion base structure 10 incorporating therein a specially designed, mechanically advantaged manual docking system 12 and used to releasably and operatively couple or "dock" a portable computer, representatively a notebook computer 14, to desktop computer peripheral devices such as the illustrated monitor 16, keyboard 18 and printer 20. In FIG. 1 the expansion base structure 10, the keyboard 18 and the printer 20 are shown resting on a representative horizontal work surface such as a desktop 22.

Referring now to FIGS. 2–5, the expansion base structure 10 includes a generally rectangular bottom side support deck 24 horizontally supported on the desktop area 22, in a slightly elevated relationship therewith, by four cylindrical leg members 26 (see FIG. 2) depending from the corners of the deck 24. The support deck 24 has opposite front and rear side edges 28,30 and opposite left and right side edges 32,34.

Representatively, the expansion base structure 10 also has a rectangular housing 36 (shown in phantom in FIGS. 1 and 2) that overlies the support deck 24 and has a rectangular docking opening 38 formed in a front side wall portion 40 of the housing 36, and through which the notebook computer 14 may be removably inserted into the interior of the housing for the purpose of "docking" the inserted computer to the representative desktop computer peripheral devices 16, 18 and 20 as later described herein. Alternatively, the housing 36 may be omitted, thereby exposing the support deck 24 to view.

In either event, in the docking procedure as subsequently described herein, the computer 14 is placed on the top side of the deck 24 and slid rearwardly therealong into a docked relationship with the system 12. To provide the computer with proper left-to-right alignment with the docking system 12, guide rail members 42,44 are respectively secured atop left and right side edge portions of the support deck 24 and longitudinally extend in front-to-rear directions.

The notebook computer 14 has a rectangular base housing 46 with a rectangular lid portion 48 pivotally secured to a rear side edge portion of the top side thereof, the lid 48 being illustrated in its closed orientation in FIGS. 1–5. Base housing 46 has front and rear side walls 50,52 and left and right side walls 54,56 (see FIG. 2), and the lid 48 has front and rear side walls 58,60 and left and right side walls 62,64. Centrally disposed on the rear side wall 52 of the base housing 52, and projecting rearwardly therefrom, is a male multi-pin electrical connector 66 positioned between two horizontally spaced circular alignment holes 68 extending through the rear base housing side wall 52. For purposes later described herein, a horizontally spaced pair of rectangular latching openings 70 extend through the rear side wall 60 of the lid 48.

With continued reference to FIGS. 2–5, the manual docking system 12 includes a rectangular support block 72 centrally mounted atop a rear side edge portion of the deck 24, and having a front side 74. Projecting forwardly from the front side 74, positioned between a pair of outwardly projecting alignment pins 76, is a female multi-pin electrical connector 78. Connector 78 is electrically coupled to conventional electrical circuitry (not shown) which is disposed within the housing 36 and is operatively coupled to the desktop peripheral devices 16,18,20 (see FIG. 1) respectively via cables 80,82,84 exiting the rear side of the housing 36. When the computer 14 is operatively docked within the expansion base structure 10, by coupling the connectors 66,78 as subsequently described herein, the computer 14 and the representatively illustrated peripheral devices 16,18,20 are operatively coupled to one another, with the central processing unit of the notebook computer 14 now serving the resulting desktop computing system.

A rectangular support plate 86 is anchored to the top side of the block 72, and a rectangular drive plate 88 having a front end 90 is slidably supported on the top side of the plate 86 for driven forward and rearward movement relative thereto by pins 92 projecting upwardly from the underlying plate 86 and received in corresponding slots 94 in the drive plate 88. Along each of its opposite left and right sides the drive plate 88 has a forwardly-to-rearwardly spaced pair of rounded projections 96 (see FIG. 7). These projections 96 are cammingly received in corresponding arcuate side edge notches 98 in a spaced pair of elongated, parallel latch arm plates 100 slidably resting atop the support plate 86 on opposite sides of the drive plate 88 (see FIGS. 5 and 7 also).

Figures 5, 6, 7:
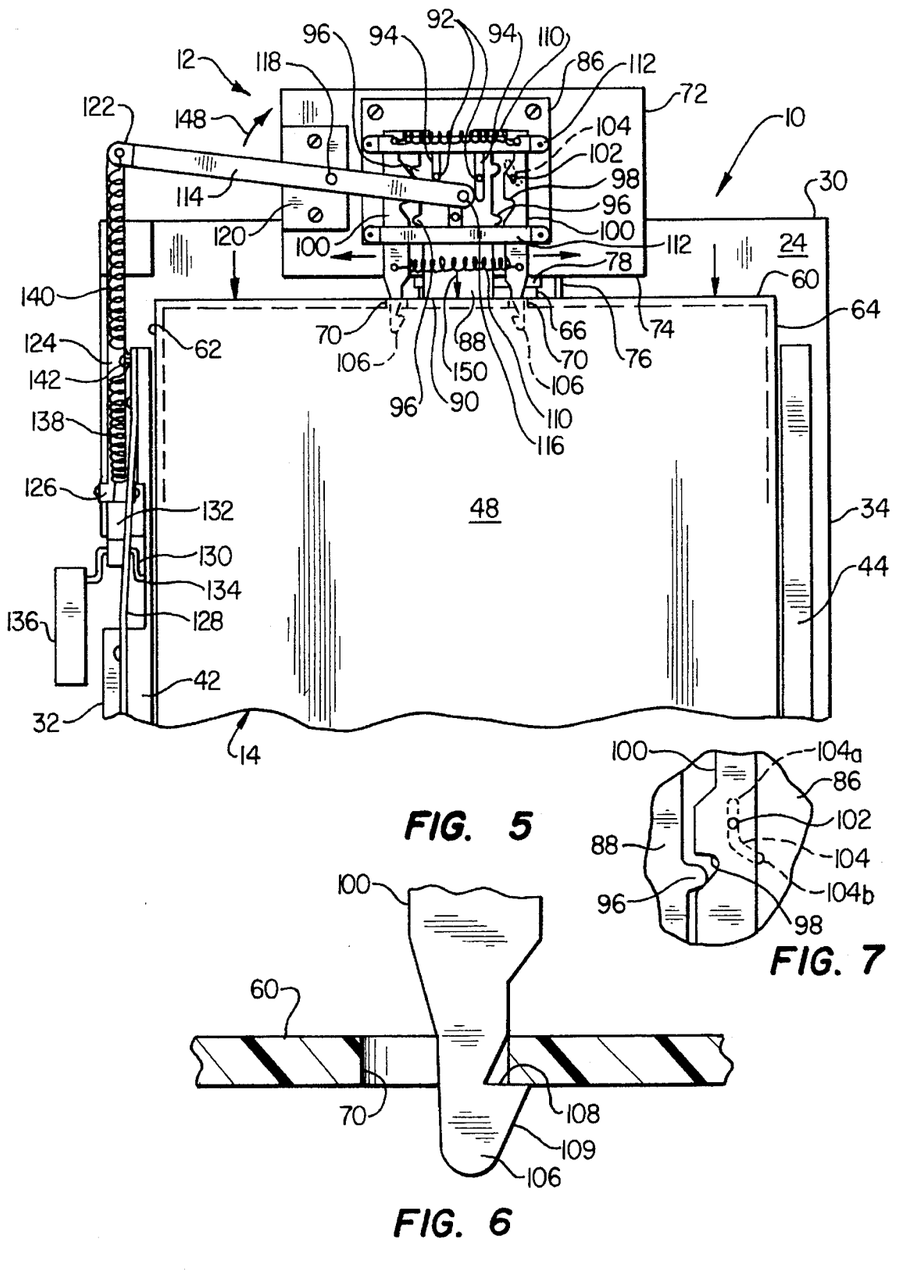
FIG. 6 is an enlarged scale detail view of the circled area "6" in FIG. 3.
FIG. 7 is an enlarged scale detail view of the circled area "7" in FIG. 3.

Latch arms 100 are guided for controlled longitudinal and lateral movement along the top side of the support plate 86 by pins 102 depending from the latch arms and slidably received in underlying arcuate slots 104 formed in the support plate 86 as best illustrated in FIG. 7. Each of the latch arms 100 has an outer end portion 106 that projects forwardly beyond the support block 72, is inwardly insertable into one of the latching openings 70 in the rear side wall 60 of the computer lid 48, and has a rearwardly facing flat catch surface 108 (see FIG. 6) and a sloping cam surface 109. The latch arms 100 are laterally and resiliently biased toward one another by a pair of coiled tension springs 110, and are restrained against vertical removal from the top side of the support plate 86 by a pair of restraining bar members 112 overlying the arms 100 and secured to the top side of the support plate 86.

A rotatable lever 114 overlies the left latch arm 100 and has a right or inner end pivotally connected at point 116 to the top side of the drive plate 88, a longitudinally intermediate portion pivotally connected at point 118 to a mounting plate 120 secured to the top side of the support block 72 to the left of the support plate 86, and a downwardly offset left or outer end 122. Outer lever end 122 is pivotally connected to the rear end of an elongated, longitudinally reciprocable drive arm 124 that is positioned outwardly of and parallel to the left guide rail 42. The drive arm 124 has an inverted U-shaped front end portion 126 that underlies and is restrained against upward movement by a horizontally sloped guide strip member 128 suitably secured to the outer side of the left guide rail 42.

A generally U-shaped crank member 130 has a central portion pivotally connected to one end of a connector member 132, the other end of which is received in and pivotally connected to the front end portion 126 of the reciprocable drive arm 124. As illustrated, one end of the crank member 130 is pivotally connected to the left guide rail at point 134 thereon, while the other end of the crank member 130 is pivotally connected to one end of an elongated rectangularly shaped manual pivot member 136. The member 136 may be manually pivoted among three positions, namely (1) a pre-docking or "neutral" position (FIGS. 2 and 3) in which the length of the member 136 extends upwardly from its connection to the crank member 130, (2) a docking position in which the member 136 has been rearwardly pivoted away from its pre-docking position to the rearwardly projecting horizontal orientation shown in FIG. 4, and (3) an undocking position in which the member 136 has been forwardly pivoted away from its docking position to the forwardly projecting horizontal orientation shown in FIG. 5.

The pivot member 136 is resiliently biased toward its pre-docking orientation (shown in FIGS. 2 and 3) by front and rear coil springs 138 and 140 that overlie the drive arm 124 in a parallel relationship therewith. Front spring 138 is interconnected between the outer end 122 of the rotatable lever 114 and a fixed point 142 on the left guide rail 42, and the rear spring 140 is interconnected between the guide rail point 142 and the front end 126 of the drive arm 124. When the pivot member 136 is manually rotated from its FIG. 3 pre-docking position to its FIG. 4 docked position, spring 138 is tensioned and spring 140 is compressed to cause both springs to resiliently urge pivot member 136 rotationally 136 back toward its FIG. 3 via the crank and connector members 130,132. When the pivot member 136 is manually rotated in the opposite direction to its FIG. 5 undocking position, the spring 140 is tensioned, while the spring 138 is compressed, to resiliently urge the pivot member 136 back toward its FIG. 3 pre-docking position in which both springs are essentially relaxed.

Figure 3:
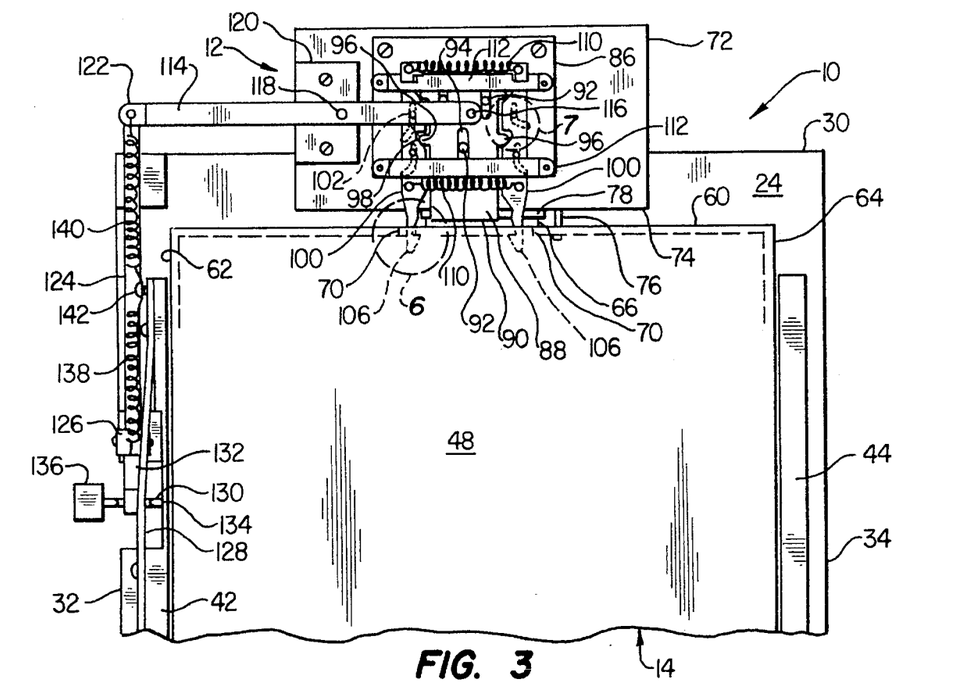
FIGS. 3, 4 and 5, respectively, are enlarged scale top plan views of portions of the portable computer and expansion base structure in (1) a latched, pre-docking orientation thereof, (2) a docked orientation thereof, and (3) an unlatched, undocked orientation thereof.

Referring now to FIGS. 1–3, with the pivot member 136 in its vertical, pre-docking orientation, the notebook computer 14 is "docked" to the expansion base structure 10, and thus operatively coupled to the representative desktop peripheral devices 16,18,20 as follows. First, the computer 14 is simply inserted, rear side first, inwardly through the housing opening 38 (see FIG. 1) in a manner such that the bottom side of the computer is slid along the top side of the support deck 24, with the opposite sides of the inserted computer also being slidably engaged by the guide rails 42 and 42 to thereby horizontally and vertically align the mateable computer and docking system electrical connectors 66,78.

As the computer connector 66 comes close to the docking system connector 78, the outer ends 106 of the latch arms 100 (see FIG. 6) enter the rear side computer lid openings 70 in a manner such that the sloped surfaces 109 of the latch member ends 106 engage peripheral portions of the rear side lid wall 60 and cam the outer latch member ends 106 slightly outwardly away from one another against the resilient tension resistance of the front spring 110. After the rear lid wall 60 rearwardly passes the sloped surfaces 109 the front spring 110 causes the front latch arm ends 106 to snap toward one another in a manner causing the rearwardly facing flat surfaces 108 of the front latch arm ends 106 to forwardly overlie the inner surface of the rear lid wall 60 to thereby lock the inserted computer against rearward removal from the housing 36.

As the computer connector 66 approaches the docking system connector 78, the alignment pins 76 enter the corresponding alignment holes 70 in the rear side base housing wall 52, thereby adding to the precision with which the connectors 66,78 are aligned before they are mated as the docking sequence is completed. In the pre-docking orientation of the computer 14 shown in FIG. 3, the connectors 66,78 are contiguous with one another, but not yet mated, and the front end 90 of the drive plate 88 is spaced a short distance rearwardly of the rear side of the inserted computer 14.

Figure 4:
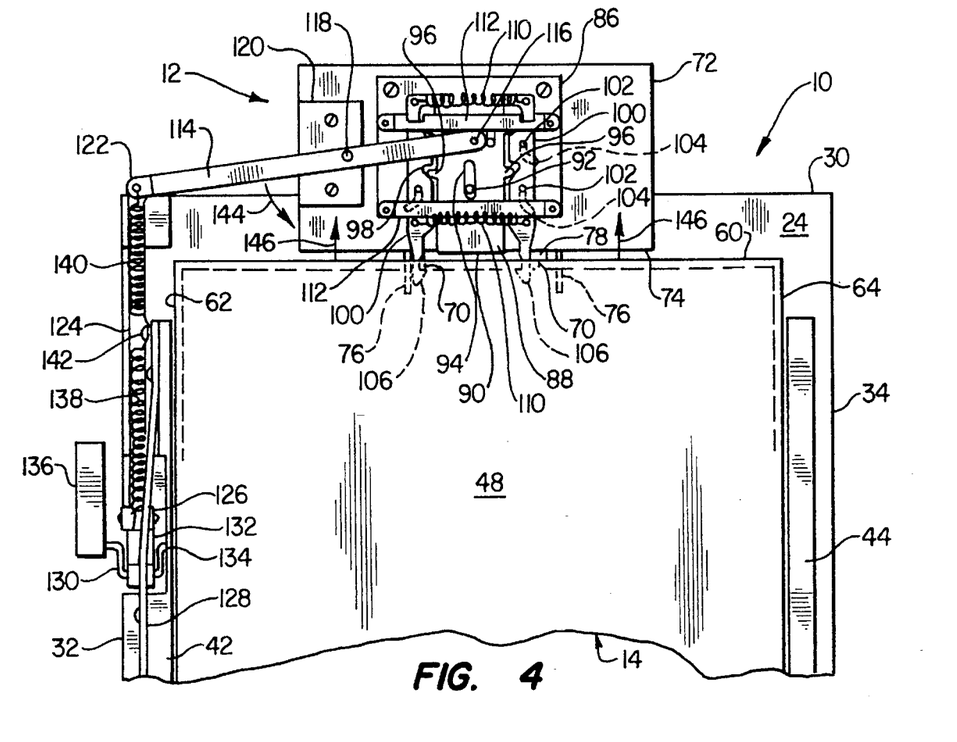

Next, as illustrated in FIG. 4, the pivot member 136 is manually rotated rearwardly through an arc of approximately ninety degrees to bring it to its docked orientation. This rearward rotation of the pivot member 136, via the crank and connector members 130 and 132, rearwardly translates the reciprocable drive arm 124 from its FIG. 3 position to its FIG. 4 position. This, in turn, forcibly rotates the lever 114 in a counterclockwise direction about the pivot point 118 (as indicated by the arrow 144 in FIG. 4), thereby rearwardly driving the drive plate 88, with a mechanically advantaged force, away from its FIG. 3 position.

Such rearward movement of the drive plate, via the interaction between the drive plate side projections 96 and the associated rear side surface portions of the latch arm notches 98 (see FIG. 7), rearwardly drives the latch arms 100 to thereby rearwardly pull the computer 14 closer to the support block 72 as indicated by the arrows 146 in FIG. 4. The driven rearward movement of the computer 14 within the housing 36 forcibly drives the computer connector 66 into operatively coupled engagement with its associated docking system connector 78. Thus, the actual docking operation is accurately and reliably achieved in the present invention by pulling the computer toward the docking system connector 78, with the pulling force being exerted on a horizontally central portion of the rear side of the computer.

To subsequently undock the computer 14 from the expansion base structure, the pivot member 136 is manually rotated forwardly from its FIG. 4 docked position to its FIG. 5 undocked position. This manual rotation of the pivot member 136, via the crank and connector members 130 and 132, forcibly rotates the lever 114 in a counterclockwise direction as indicated by the arrow 148 in FIG. 5. In turn, this forwardly drives the plate 88 away from its FIG. 4 position toward the rear side wall 60 of the computer lid 48 as indicated by the arrow 150 in FIG. 5. As the plate 88 begins its forward movement, its side projections 96 (see FIG. 7) engage front edge portions of their associated latch arm notches 98 and begin to also drive the latch arms 100 in a forward direction.

Initial forward movement of the latch arms 100 causes their depending pins 102 to move along straight portions 104a of their associated support plate slots 104. This, in turn, causes the front ends 106 of the latch arms to be moved further inwardly through the rear computer lid side wall openings 70 to thereby disengage the latch arm "catch" surfaces 108 from the inner side of the rear lid wall 60.

Continued forward driven movement of the latch arms 100 causes their depending pins 102 to enter outwardly curved portions 104b of the underlying support plate slots 104, thereby causing the drive plate side projections 96 to outwardly cam their associated latch arms 100, against the resilient resistance of the front spring 110, in a manner generally centering the latch arm ends 106 in the lid wall openings 70. This unlatches the arm ends 106 from the computer 14 and permits it to be moved rearwardly away from the docking system connector 78.

While the arms 100 are being cammed outwardly of latching engagement with the still-docked computer 14, the continuing forward rotation of the pivot member 136 toward its FIG. 5 undocked position forces the drive plate forwardly against the rear computer lid wall 60 and rearwardly moves the computer away from the support block 72 in a manner forcibly uncoupling the computer connector 66 from the docking system connector 78, thereby undocking the computer 14 from the expansion base structure 10 as the pivot member 136 approaches its FIG. 5 undocked position.

To summarize the docking operation, the computer 14 is rearwardly inserted into the housing 36 and "clicked" onto the front latch arm ends 106. The pivot arm is then rearwardly rotated to forcibly dock the computer, and is subsequently rotated in the opposite direction to undock the computer 14. The manual docking system just described eliminates the awkwardness and difficultly of having to manually grasp the docked computer and pull it with sufficient force to decouple the computer and docking system connectors. Additionally, the only manual docking force that needs to be applied is applied to the external pivot member 136 (see FIG. 1), the balance of the manual docking system being protectively disposed within the housing 136.

While the docking system 12 illustrated and described herein may be used to exert both mechanically advantaged docking and undocking forces on the representatively illustrated notebook computer 14, if desired, the computer 14 can be easily docked to the expansion base structure 10 without using the pivot member 136. Specifically, after the housing-inserted computer 14 has been "clicked" onto the latch arms 100 the computer user may simply push the inserted computer 14 further back toward the docking system connector 78 to manually effect docking without using the mechanically leveraged docking force resulting from the use of the pivot member 136. Subsequently, the docked computer can be undocked by forwardly rotating the pivot member 136 as previously described.

The foregoing detailed description is to be clearly understood as being given by way of illustration and example only, the spirit and scope of the present invention being limited solely by the appended claims.

What is claimed is:

1. Manual docking apparatus for use in operatively connecting a portable computer to a desktop computer peripheral device, the portable computer having a rear side wall upon which a first electrical connector is carried, said manual docking apparatus comprising:

an expansion base structure having a generally horizontally oriented support deck upon which the portable computer may be positioned for forward and rearward sliding movement relative thereto, a rear portion having a second, forwardly disposed electrical connector releasably mateable with the first electrical connector to couple it to the peripheral device, and guide members slidably engageable with the portable computer and operative to horizontally align said second electrical connector with the first electrical connector; and a manual docking assembly operable, with the portable computer placed on said support deck, to horizontally move the portable computer toward and away said rear expansion base structure portion in a manner respectively mating and disconnecting said first and second electrical connectors, said manual docking assembly including:

latch and drive means associated with said rear expansion base structure portion and being operatively movable sequentially from (1) a pre-docking position in which, in response to rearward manual movement of the portable computer toward said latch and drive means along said support deck, said latch and drive means are releasably locked to the rear side wall of the portable computer, with the first and second electrical connectors being aligned with one another but not operatively coupled, to (2) a docked position in which said latch and drive means have been moved to drive the rear side wall of the portable computer toward said rear expansion base structure portion in a manner forcibly mating the first and second electrical connectors, to (3) an undocked, released position in which the first and second electrical connectors have been forcibly disengaged from one another and said latch and drive means have been detached from the rear side wall of the portable computer, and control means for receiving a manual positioning force and responsively moving said latch and drive means selectively between said pre-docking position, said docked position, and said undocked, released positions thereof.

2. The manual docking apparatus of claim 1 wherein:

said control means are operative to exert mechanically advantaged forces on said latch and drive means.

3. The manual docking apparatus of claim 2 wherein said control means include:

a manually movable lever member supported for pivotal movement relative to said support deck, and linkage means interconnected between said lever member and said latch and drive means and operative to amplify the manual force exerted on the lever member and operatively transmit the amplified force to said latch and drive means.

4. The manual docking apparatus of claim 3 wherein:

said manually movable lever member is rotatable between (1) a first position corresponding to said pre-docking position of said latch and drive means, (2) a second position corresponding to said docked position of said latch and drive means, and (3) a third position corresponding to said undocked, released position of said latch and drive means, and said manual docking apparatus further comprises spring means for resiliently biasing said manually movable lever member toward said first position thereof.

5. The manual docking apparatus of claim 1 wherein:

said latch and drive means are further operative to be moved from said pre-docking position thereof to said docked position thereof in response to a direct rearward manual force exerted on the portable computer when said latch and drive means are in said pre-docking position thereof.

6. The manual docking apparatus of claim 1 wherein:

the portable computer has a pair of openings formed in the rear side wall thereof on horizontally opposite sides of the first electrical connector, and said latch and drive means include a spaced apart, generally parallel pair of latch arm members pivotally supported on said rear expansion base structure portion and having forwardly projecting end portions configured to be releasably and latchingly received forwardly into the pair of openings in the rear side wall of the portable computer.

7. The manual docking apparatus of claim 6 wherein said latch and drive means further include:

spring means for resiliently exerting a lateral biasing force on said latch arm members.

8. The manual docking apparatus of claim 1 wherein said latch and drive means include:

a drive plate member slidably carried on said rear expansion base structure and being forwardly and rearwardly drivable relative thereto, into and out of engagement with the rear side wall of the portable computer, in response to manually driven movement of said control means.

9. Manual docking apparatus for use in operatively connecting a portable computer to a desktop computer peripheral device, said manual docking apparatus comprising:

a horizontally positionable support deck having a rear side portion, and a pair of upwardly projecting elongated guide portions longitudinally extending in a spaced apart, parallel relationship along opposite left and right side portions of said support deck;

a support block member carried on said rear side portion of said support deck and having a front side;

an electrical connector carried on said front side of said support block member;

a first elongated member carried by said support deck for longitudinal movement in a front-to-rear direction relative thereto;

a manual pivot member carried by said support deck for pivotal movement relative thereto and linked to a front end portion of said first elongated member in a manner longitudinally moving it in a front-to-rear direction in response to manually created pivotal movement of said pivot member;

a second elongated member pivotally connected at a first end thereof to a front end portion of said first elongated member, pivotally connected at a longitudinally intermediate portion thereof to said support block member, and having a second end;

a drive plate member supported above said support block for sliding forward and rearward movement relative thereto, said drive plate member being pivotally secured to said second end of said second elongated member in a manner causing said drive plate member to be driven forwardly in response to rearward movement of said first elongated member, and to be driven rearwardly in response to forward movement of said first elongated member; and a spaced pair of elongated latch arm members having indented front end portions and being supported above said support block, on opposite sides of said drive plate member, for longitudinal movement in front-to-rear directions between a rearwardly shifted first position in which said latch arm members are generally parallel, with said indented front end portions thereof forwardly projecting outwardly beyond said support block, and a forwardly shifted second position in which said front end portions of said latch arm members are pivoted outwardly from one another toward said guide portions of said support deck, said latch arm members and said drive plate member having cooperatively engaged portions operative to cause said drive plate member to drive said latch arm members from said first position thereof to said second position thereof in response to forward movement of said drive plate member relative to said support block.

10. The manual docking apparatus of claim 9 wherein:

said pivot member is manually pivotable between a first rotational position, a second rotational position, and a third rotational position disposed between said first and second rotational positions, and said manual docking apparatus further comprises spring means for resiliently biasing said pivot lever toward said third rotational position thereof.

11. The manual docking apparatus of claim 10 wherein said spring means include:

a first coil spring member having a first end secured to one of said guide portions of said support deck, and a second end secured to said front end portion of said first elongated member, and a second coil spring member having a first end secured to said one of said guide portions of said support deck, and a second end secured to said first end of said second elongated member.

12. The manual docking apparatus of claim 9 wherein:

said pivot member is pivotally linked to a generally U-shaped crank member in turn pivotally linked to one of said support deck guide portions, said manual docking apparatus further comprises a linking member having first and second opposite ends, said crank member is pivotally connected to said first end of said linking member, and said front end portion of said first elongated member is pivotally connected to said second end of said linking member.

13. The manual docking apparatus of claim 12 wherein:

said front end portion of said first elongated member underlies a side portion of one of said support deck guide portions, with said side portion acting as an upward stop to limit upward movement of said front end portion of said first elongated member.

14. The manual docking apparatus of claim 9 further comprising:

spring means for laterally biasing said latch arm members toward one another.

15. The manual docking apparatus of claim 14 wherein said spring means include:

a first spring member having first and second ends connected to rear end portions of said latch arm members, and a second spring member having first and second ends connected to front end portions of said latch arm members.

16. The manual docking apparatus of claim 9 further comprising:

first and second guide pin members projecting forwardly from said support block front side on horizontally opposite sides of said electrical connector.

17. The manual docking apparatus of claim 9 wherein:

said support block has a support plate mounted on the upper side thereof, said support plate has arcuate slots formed therein, and said latch arm members have guide pins depending therefrom and slidably received in said arcuate slots.

18. The manual docking apparatus of claim 17 wherein:

said support plate has a guide pin portion projecting upwardly therefrom and slidably received in an associated slot in said drive plate.

19. The manual docking apparatus of claim 18 further comprising:

a spaced pair of retaining members overlying said drive plate and said latch arm members and preventing upward dislodgement thereof from said support plate.

20. The manual docking apparatus of claim 9 wherein:

said latch arm members have facing side edge depressions formed therein, and said drive plate has projections formed on opposite side edge portions thereof and cammingly received in said facing side edge depressions on said latch arm members.

* * * * *